(12) United States Patent
Nishimoto et al.

(10) Patent No.: US 10,401,042 B2
(45) Date of Patent: Sep. 3, 2019

(54) HEAT SOURCE UNIT

(71) Applicant: MITSUBISHI ELECTRIC CORPORATION, Chiyoda-ku, Tokyo (JP)

(72) Inventors: Keisuke Nishimoto, Tokyo (JP); Yasushi Okoshi, Tokyo (JP); Takuya Ito, Tokyo (JP); Hiroshi Yamaguchi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/565,246

(22) PCT Filed: Apr. 20, 2016

(86) PCT No.: PCT/JP2016/062527
§ 371 (c)(1),
(2) Date: Oct. 9, 2017

(87) PCT Pub. No.: WO2016/171177
PCT Pub. Date: Oct. 27, 2016

(65) Prior Publication Data
US 2018/0080667 A1  Mar. 22, 2018

(30) Foreign Application Priority Data

Apr. 21, 2015 (JP) ................................. 2015-086397

(51) Int. Cl.
*F24H 3/06* (2006.01)
*F24F 1/16* (2011.01)
(Continued)

(52) U.S. Cl.
CPC ................. *F24F 1/16* (2013.01); *F24F 1/18* (2013.01); *F24F 1/20* (2013.01); *F25B 1/00* (2013.01);
(Continued)

(58) Field of Classification Search
CPC ....... F24F 1/16; F24F 1/20; F24F 1/18; F28D 1/0475; F28D 2021/0068; F25B 39/00; F25B 1/00
(Continued)

(56) References Cited

U.S. PATENT DOCUMENTS

| 4,852,362 A | 8/1989 | Conry |
| 7,921,904 B2 * | 4/2011 | Matter .................. F28D 1/0417 165/150 |

(Continued)

FOREIGN PATENT DOCUMENTS

| CN | 103759553 A | 4/2014 |
| CN | 103822394 A | 5/2014 |

(Continued)

OTHER PUBLICATIONS

International Search Report (PCT/ISA/210) dated Jul. 19, 2016, by the Japanese Patent Office as the International Searching Authority for International Application No. PCT/JP2016/062527.
(Continued)

*Primary Examiner* — Claire E Rojohn, III
(74) *Attorney, Agent, or Firm* — Buchanan Ingersoll & Rooney PC

(57) ABSTRACT

Air heat exchangers are composed of a first air heat exchanger through a fourth air heat exchanger, which are formed in a L shape, which include long side portions and short side portions in a state where one end portion sides in an extension direction of tubes, in which a coolant is flowed, are bent; and each of the short side portions is disposed at a
(Continued)

short hand side of a rectangular shape, in such a way that an arrangement shape of the first air heat exchanger through the fourth air heat exchanger is formed as a frame shape having a rectangular shape viewed from a plane.

8 Claims, 13 Drawing Sheets

(51) Int. Cl.
  *F25B 1/00* (2006.01)
  *F24F 1/18* (2011.01)
  *F24F 1/20* (2011.01)
  *F25B 39/00* (2006.01)
  *F28D 1/047* (2006.01)
  *F28D 21/00* (2006.01)
  *F28B 1/06* (2006.01)
(52) U.S. Cl.
  CPC ............ *F25B 39/00* (2013.01); *F28D 1/0475* (2013.01); *F28B 1/06* (2013.01); *F28D 2021/0068* (2013.01)
(58) Field of Classification Search
  USPC ........................................................ 165/122
  See application file for complete search history.

(56) References Cited

U.S. PATENT DOCUMENTS

| | | | | |
|---|---|---|---|---|
| 2009/0025914 | A1* | 1/2009 | Knight | F25B 39/00 165/144 |
| 2010/0162739 | A1* | 7/2010 | Kopko | F24F 1/16 62/115 |
| 2012/0125033 | A1* | 5/2012 | Tanno | F24F 3/06 62/324.1 |
| 2012/0131935 | A1* | 5/2012 | Kim | F24F 3/0442 62/115 |
| 2013/0333409 | A1 | 12/2013 | Tanno et al. | |
| 2015/0122455 | A1* | 5/2015 | Fox | F28F 21/084 165/67 |
| 2016/0327343 | A1* | 11/2016 | Hwang | F28D 1/0435 |
| 2017/0010045 | A1 | 1/2017 | Yang et al. | |
| 2017/0108278 | A1* | 4/2017 | Yanik | F25B 39/00 |
| 2017/0130974 | A1* | 5/2017 | Mercer | F24F 1/50 |

FOREIGN PATENT DOCUMENTS

| | | | |
|---|---|---|---|
| EP | 2461111 | A1 | 6/2012 |
| JP | 59-002809 | B2 | 1/1984 |
| JP | S60-021642 | U | 2/1985 |
| JP | 60021642 | Y2 * | 6/1985 |
| JP | 62-029851 | A | 2/1987 |
| JP | 01-016990 | Y2 | 5/1989 |
| JP | 08-012023 | B2 | 2/1996 |
| JP | 09-014698 | A | 1/1997 |
| JP | 10-185240 | A | 7/1998 |
| JP | 2011-102662 | A | 5/2011 |
| JP | 2012-013302 | A | 1/2012 |
| JP | 5555701 | B2 | 7/2014 |
| WO | WO 2011/099629 | A1 | 8/2011 |
| WO | WO 2013/118381 | A1 | 8/2013 |
| WO | 2013/151005 | A1 | 10/2013 |

OTHER PUBLICATIONS

Written Opinion (PCT/ISA/237) dated Jul. 19, 2016, by the Japanese Patent Office as the International Searching Authority for International Application No. PCT/JP2016/062527.

Extended European Search Report dated Dec. 14, 2018, issued by the European Patent Office in corresponding European Application No. 16783198.1. (7 pages).

Office Action (Notification of Reasons for Refusal) dated Mar. 27, 2018, by the Japanese Patent Office in corresponding Japanese Patent Application No. 2017-514166 and English translation of the Office Action. (9 pages).

Office Action dated May 30, 2019, issued in corresponding Chinese Application No. 201680023038.8, and a machine English translation thereof.

* cited by examiner

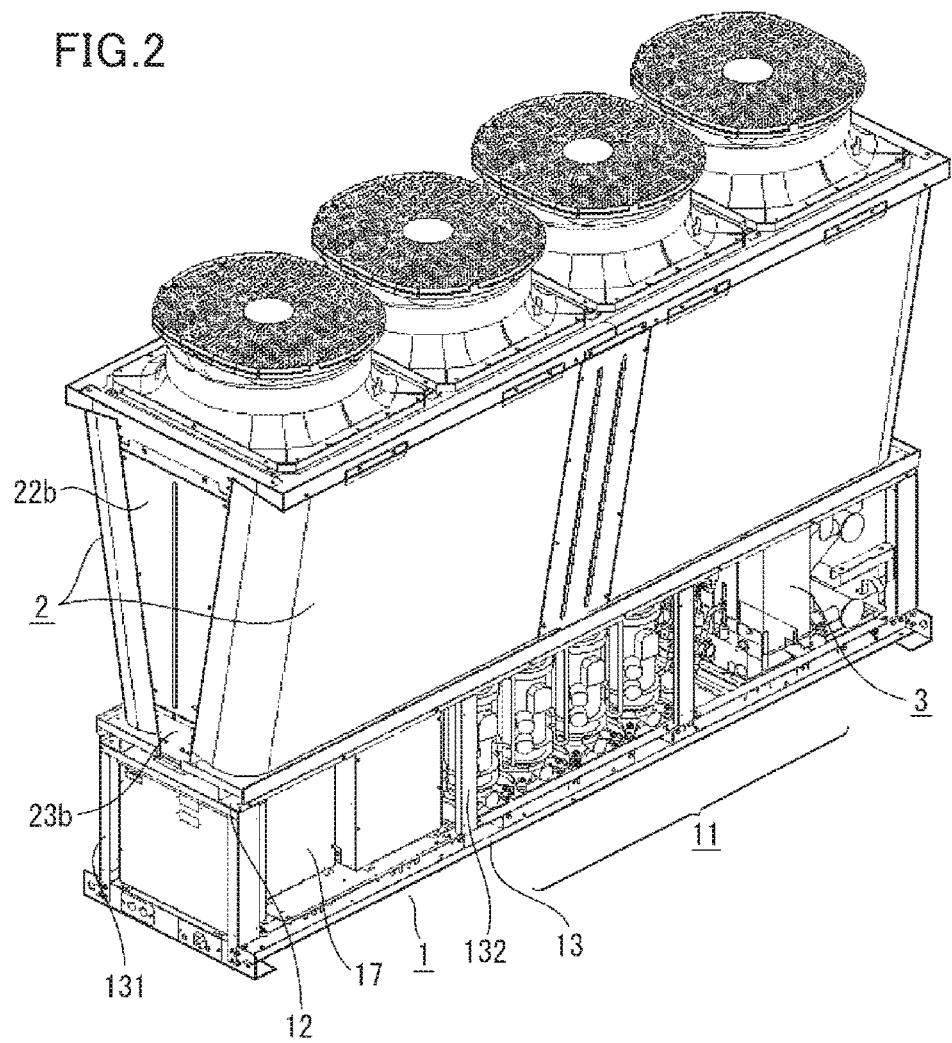

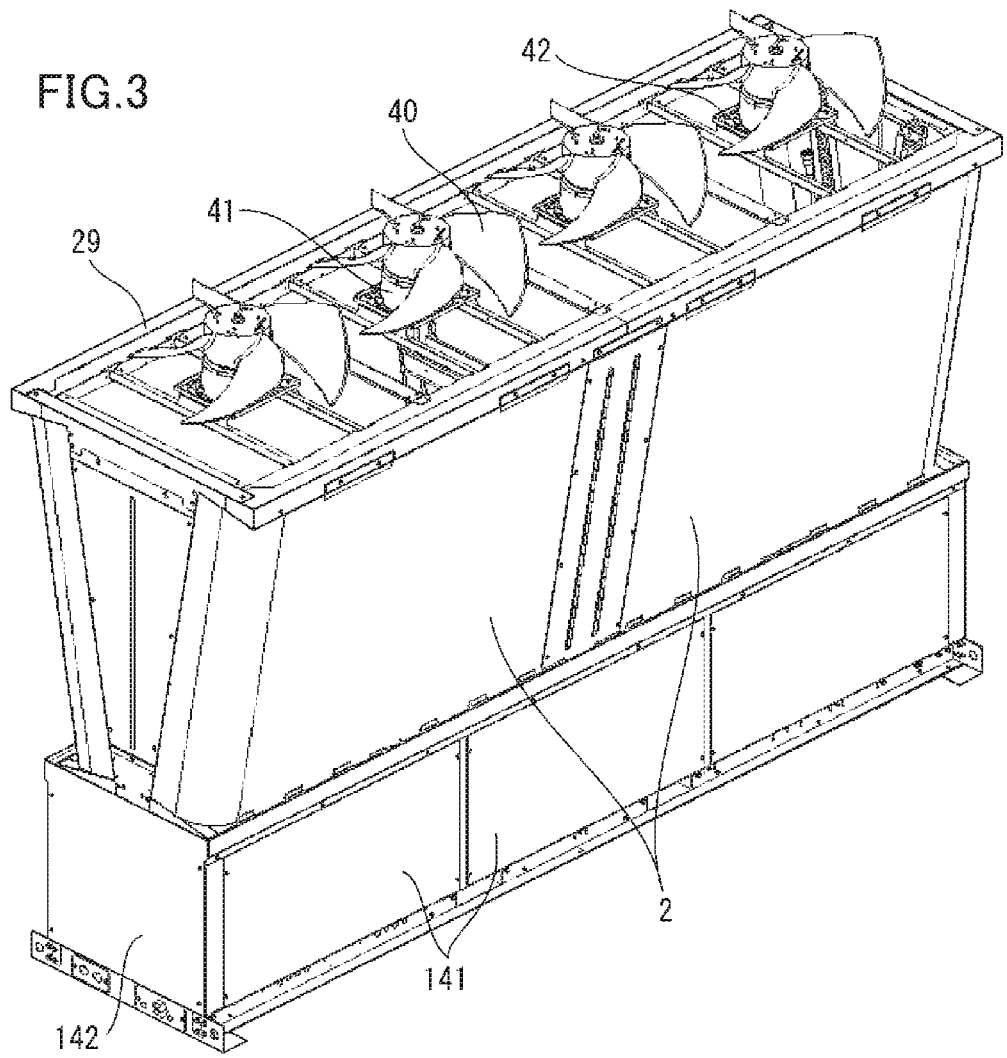

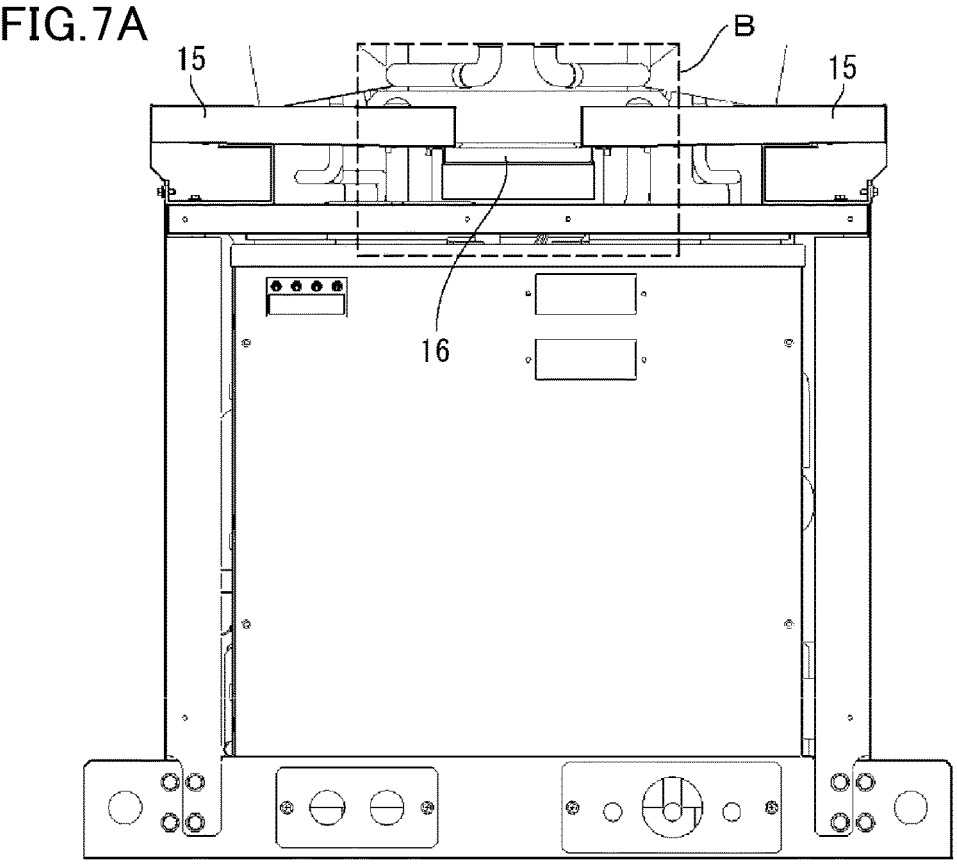
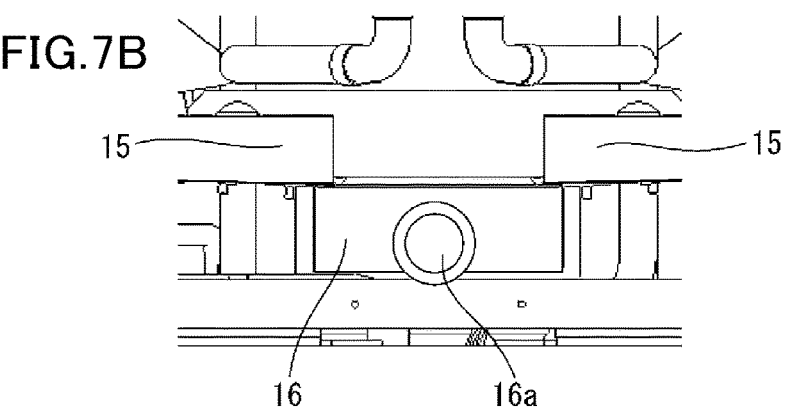

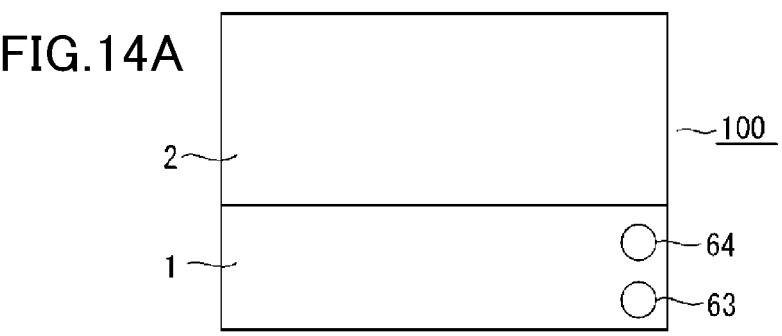
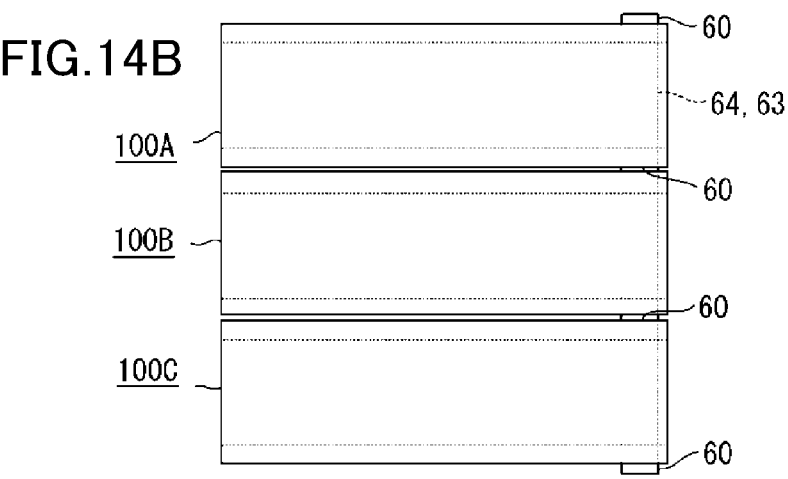

though these have been problems in that fan efficiency is deteriorated because an inhaling pressure loss of the air heat exchangers are increased, and a maintenance capability is deteriorated because header portions of the air heat exchangers are

HEAT SOURCE UNIT

BACKGROUND OF THE INVENTION

Technical Field

The present invention relates to a heat source unit which composes an air conditioner, a heat pump hot-water supply device or the like.

Background Art

In conventional heat source units, there is a heat source unit in which a plurality of fins are respectively arranged in a state where a predetermined distance intervenes, and a heat exchanging pipe penetrates the fins, and a plurality of air heat exchangers, in which bent pieces, which are bent in an identical direction along both side portions, are included, are included, and the plurality of air heat exchangers are provided in such a way that the bent pieces are faced each other in the two air heat exchangers, and lower end portions of each of the air heat exchangers are closed each other, and upper end portions are inclined so as to be provided in such a way that the upper end portions are separated each other, and at least a part of the bent pieces is provided in such a way that the part of the bent pieces is exposed, and moreover, a plurality of air heat exchangers are provided in a direction where two air heat exchangers are faced and in a direction where two air heat exchangers are orthogonal, and the air heat exchangers, which are faced, are inclined in such a way that a distance of the air heat exchangers is narrowed from an upper end portion to a lower portion in a state where the air heat exchangers have a roughly reverse V shape which is viewed from a side surface, and a machine room, which is provided at lower portion of the air heat exchangers, has a roughly reverse V shape viewed from a side surface in such a way that a deep direction is gradually expanded, whereby the heat source unit is formed in a roughly drum shape, of which central portion is constricted, which is viewed from a side surface as the heat source unit (for example, refer to Patent Document 1).

Moreover, in heat pump-type heat source mechanisms in which heat pump configuration instruments, which are air heat exchangers, a blower, a compressor, a heat exchanger and the like, are installed in a case, there is a heat pump-type heat source mechanism in which the case includes an upper case which is inclined and formed in such a way that a width is reduced in a state where both right-left side surfaces, which are viewed from a front, are faced in a lower direction, and a lower case which is continuously provided at a lower surface of the upper case, and the air heat exchangers are provided at both right-left sides of the upper case, and the blower is provided at the upper case in such a way that air, which is inhaled from the both right-left sides, is passed through the air heat exchanger so as to be ejected from the upper case, and the compressor and the heat exchangers are provided at the lower case, and the lower case is formed in a rectangular solid shape in a state where a front shape and a back shape are formed in a rectangular shape, and a width in a right-left direction of the lower case is equivalent to a width in a right-left direction of a lower surface of the upper case, and a difference between a width in a right-left direction of an upper surface of the upper case and a width in a right-left direction of the lower case is greater than equal to 400 mm, and a length size in an upper-lower direction of the lower case is greater than a width in a right-left direction of the lower case (for example, refer to Patent Document 2).

CONVENTIONAL ART DOCUMENT

Patent Document

Patent Document 1: Japanese Patent Publication No. 5555701
Patent Document 2: Japanese Laid-Open Patent Publication No. 2012-013302

SUMMARY OF THE INVENTION

Problems to be Solved by the Invention

In the heat source unit which is indicated in Patent Document 1, the air heat exchangers are minutely separated and assembled, so that the many numbers of components, which compose a case and a coolant circuit, are required. There is a portion at which the air heat exchangers are respectively faced at a near position, and there have been problems in that fan efficiency is deteriorated because an inhaling pressure loss of the air heat exchangers are increased, and a maintenance capability is deteriorated because header portions of the air heat exchangers are arranged at a deep portion of a chiller, and an inhaling pressure loss is increased when the heat source unit is linked and disposed because a machine room at a lower portion of the heat source unit is formed in a trapezoid shape of which bottom side is wide, and it is difficult that maintenance space of the machine room is secured.

Moreover, in the heat source unit which is indicated in Patent Document 2, although a maintenance capability of a machine room when the heat source unit is linked and disposed, and an inhaling pressure loss, and a maintenance capability for a header portion of the air heat exchanger and the machine room, and an efficiency capability of the air heat exchanger, and the number of components are improved in comparison with the air heat exchangers which is indicated in Patent Document 1, a disposing surface of the air heat exchanger is provided only in a long hand direction of the heat source unit, and it is difficult that an area of the air heat exchanger is secured, so that there has been a problem in that a securement of an output capacity is reduced.

The present invention has been made to solve the above-described problems, and an object of the invention is to obtain a heat source unit, in which a configuration is simple, and a maintenance capability and heat exchanging efficiency are improved, and the heat source unit is easily produced.

Means for Solving Problems

A heat source unit of the present invention is a heat source unit in which a plurality of air heat exchangers, in which radiating fins having a plate shape, which are corresponding to a predetermined number, are spaced in a plate thickness direction of the radiating fins so as to be arranged, and a plurality of tubes, in which a coolant in a freezing cycle is flowed, are inserted toward the radiating fins in the plate thickness direction of the radiating fins so as to be linked to the radiating fins, are faced and arranged in a right-left direction, at an upper portion of a machine room having a rectangular shape viewed from a plane, in a state where a distance at an upper portion side is expanded in such a way that the air heat exchangers are formed in a V shape viewed from a short hand side; wherein the air heat exchangers are composed of a first air heat exchanger through a fourth air heat exchanger, which are formed in a L shape, which include long side portions and short side portions in a state where one end portion sides in an extension direction of the tubes are bent; and each of the short side portions is disposed at a short hand side of the machine room having a rectangular shape viewed from a plane, in such a way that an arrangement shape of the first air heat exchanger through the fourth air heat exchanger is formed as a frame shape having a rectangular shape viewed from a plane.

Effects of the Invention

According to the heat source unit of the present invention, the air heat exchangers are composed of a first air heat exchanger through a fourth air heat exchanger, which are formed in a L shape, which include long side portions and short side portions in a state where one end portion sides in an extension direction of the tubes are bent; and each of the short side portions is disposed at a short hand side of a rectangular shape, in such a way that an arrangement shape of the first air heat exchanger through the fourth air heat exchanger is formed as a frame shape having a rectangular shape viewed from a plane, whereby the air heat exchangers have not a portion at which ventilation portions of the air heat exchangers, which are faced, are closed each other, so that heat exchanging efficiency is improved, and moreover, the used air heat exchangers are formed in a L shape, whereby the air heat exchangers have few bent portions, so that the air heat exchangers are easily produced. Moreover, for example, headers of the air heat exchangers can be arranged only at a short hand side of the machine room, so that a maintenance capability can be improved when the air heat exchangers are linked and disposed.

BRIEF DESCRIPTION OF THE DRAWINGS

FIG. 1A is an oblique perspective view which indicates an outward appearance of the heat source unit, and FIG. 1B is a top view which schematically indicates an arrangement of an air heat exchanger;

FIG. 2 is an oblique perspective view in which a machine room panel and the like in FIG. 1A and FIG. 1B are not indicated;

FIG. 3 is an oblique perspective view in which a bell mouth and the like in FIG. 1A and FIG. 1B are not indicated;

FIG. 7A and FIG. 7B are views in which the machine room in FIG. 5 is viewed from a short hand side, and FIG. 7A is a front view, and FIG. 7B is a detailed view which indicates a drain arrangement pipe in a state where a portion, which is surrounded by a dashed line B in FIG. 7A, is viewed from a back surface side of the machine room;

FIG. 9A is a view in which the heat exchanging device is viewed from a view point C in FIG. 8, and FIG. 9B is a view in which the heat exchanging device is viewed from a view point D in FIG. 8, and FIG. 9C is a view which indicates an example in which a pump at a used side is disposed in a machine room;

FIG. 1B is compared with a conventional example so as to be explained, and FIG. 10A indicates a case of Embodiment 1, and FIG. 10B indicates a case of the conventional example;

FIG. 12A is a view in which the heat source unit is viewed from a long hand side of the heat source unit, and FIG. 12B is a top view of the heat source unit;

FIG. 14A and FIG. 14B are views which schematically indicate a connection state of a heat source unit according to Embodiment 4 of the present invention, and FIG. 14A is a view in which the heat source unit is viewed from a long hand side of the heat source unit, and FIG. 14B is a top view of the heat source unit.

MODE FOR CARRYING OUT THE INVENTION

Embodiment 1

Figure 1A:
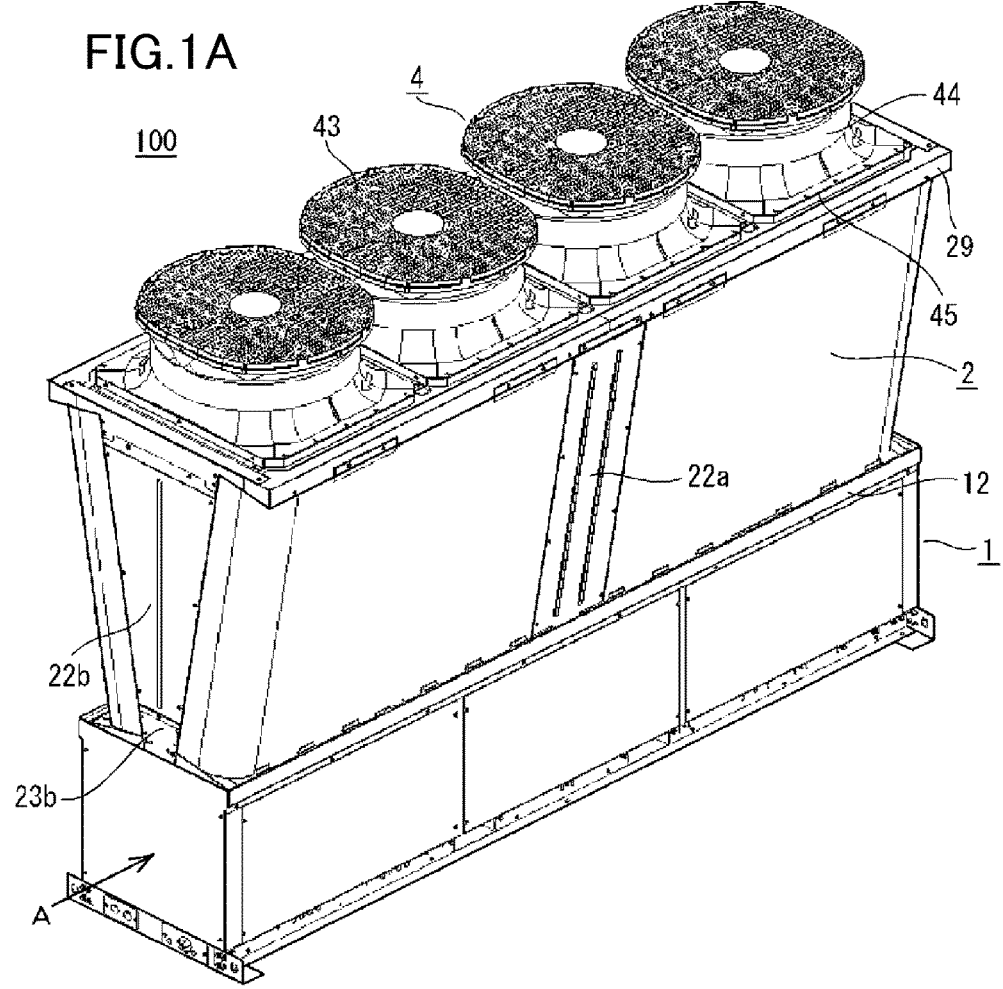
FIG. 1A and FIG. 1B are views which indicate a heat source unit of a chiller device according to Embodiment 1 of the present invention.
Figure 1B:
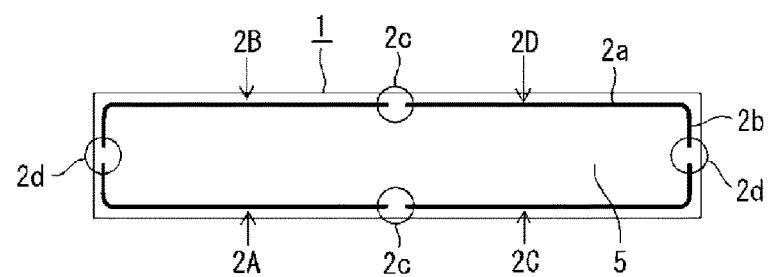
Figure 4:
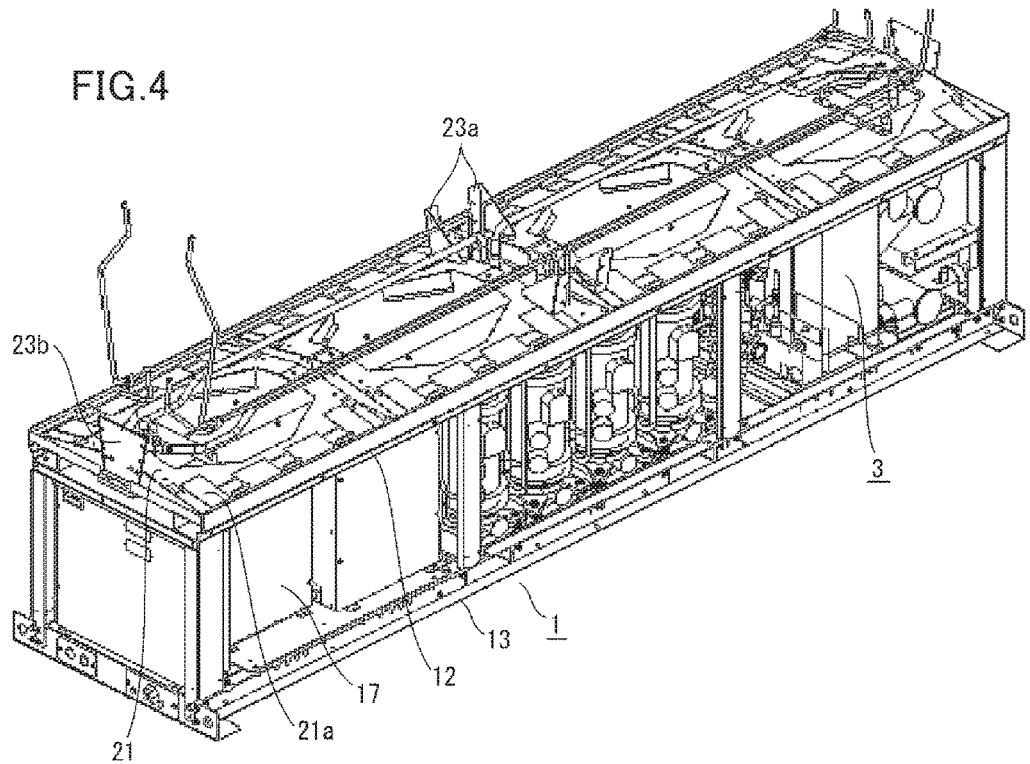
FIG. 4 is an oblique perspective view in which upper elements from the air heat exchanger in FIG. 2 are not indicated.
Figure 5:
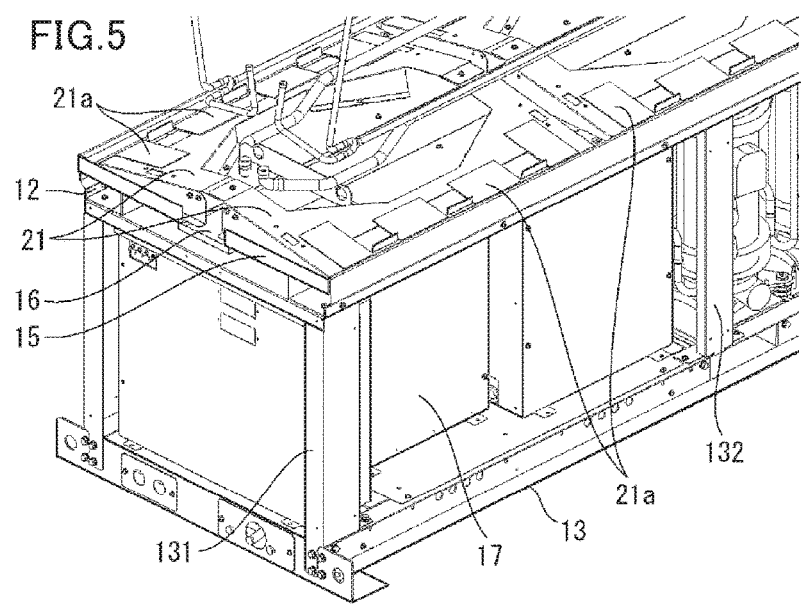
FIG. 5 is an oblique perspective view in which adjacent portions of a control box of a machine room in FIG. 4 are enlarged and indicated.
Figure 6:
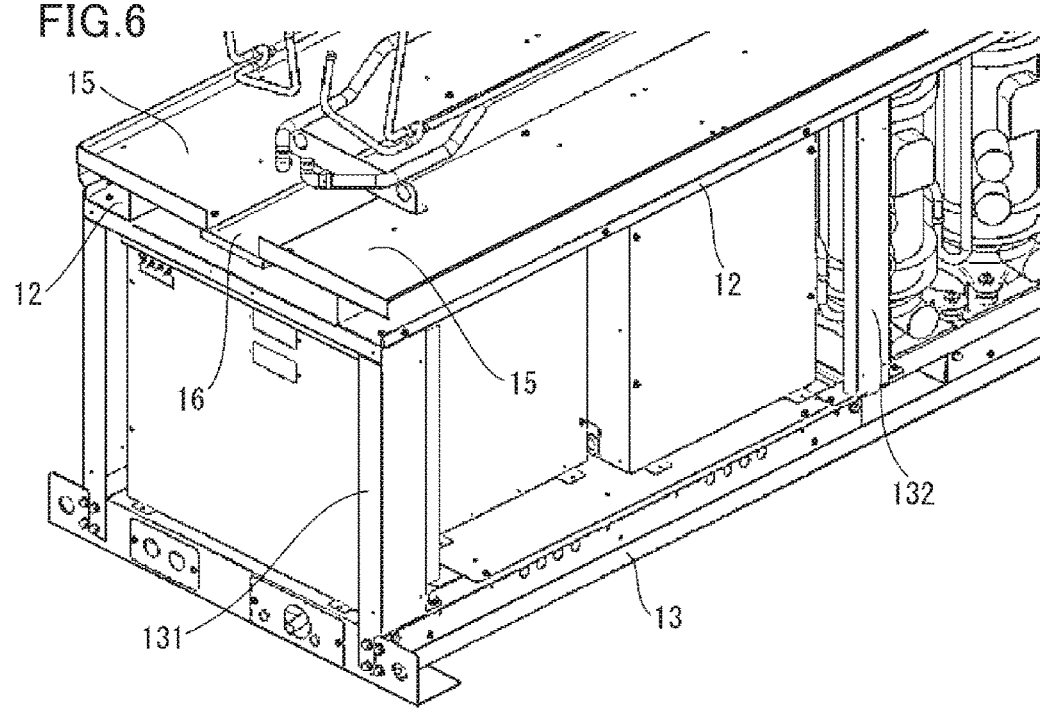
FIG. 6 is an oblique perspective view in which an air heat exchanger base of the machine room in FIG. 5 is not indicated.

FIG. 1A and FIG. 1B are views which indicate a heat source unit of a chiller device according to Embodiment 1 of the present invention, and FIG. 1A is an oblique perspective view which indicates an outward appearance of the heat source unit, and FIG. 1B is a top view which schematically indicates an arrangement of an air heat exchanger. FIG. 2 is an oblique perspective view in which a machine room panel and the like in FIG. 1A and FIG. 1B are not indicated, and FIG. 3 is an oblique perspective view in which a bell mouth and the like in FIG. 1A and FIG. 1B are not indicated, and FIG. 4 is an oblique perspective view in which upper elements from the air heat exchanger in FIG. 2 are not indicated, and FIG. 5 is an oblique perspective view in which adjacent portions of a control box of a machine room in FIG. 4 are enlarged, and FIG. 6 is an oblique perspective view in which an air heat exchanger base of the machine room in FIG. 5 is not indicated. FIG. 7A and FIG. 7B are views in which the machine room in FIG. 5 is viewed from a short hand side, and FIG. 7A is a front view, and FIG. 7B is a detailed view which indicates a drain arrangement pipe in a state where a portion, which is surrounded by a dashed line D in FIG. 7A, is viewed from a back surface side of the machine room. In addition, the heat source unit of the present invention is used as a heat source device of a chiller device which supplies cool heat or warm heat to a user side in such a way that, for example, a heat transfer fluid, such as a water or an antifreeze solution, is cooled or heated so as to be transferred and supplied to the user side, and the heat transfer fluid is circulated.

In FIG. 1A through FIG. 7B, a heat source unit 100 includes a coolant circuit 11 including a compressor and the like, which compose a freezing cycle at a heat source side, a machine room 1 having a rectangular solid shape, by which an element instrument, which includes a heat exchanging device 3 which is composed of a plate heat exchange for a heat transfer fluid at a user side, which is described below, is disposed; a plurality of air heat exchangers 2, formed by a so-called fin and tube method, which are arranged at an upper portion of the machine room 1 in a state where a distance at an upper portion side is expanded and the air heat exchangers 2 are faced at left and right positions in such a way that the air heat exchangers 2 are formed in a V shape viewed from a short hand side, which is indicated by an arrow A at the machine room 1; and fan devices 4 which are disposed at upper portions of the air heat exchangers 2. The air heat exchangers 2 are arranged in a state where radiating fins having a plate shape, which are corresponding to a predetermined number, are spaced in a plate thickness direction of the radiating fins so as to be arranged, and a plurality of tubes, in which a coolant in a freezing cycle is flowed, are inserted toward the radiating fins in a plate thickness direction of the radiating fins, and heat exchangers having a plane shape, which are linked to each of the radiating fins, are laminated in a single row or a plurality of rows in a ventilation direction, are bent at 90 degrees in an arc shape at one end portion side in an extension direction of the tubes, whereby the air heat exchangers 2, which are composed of long side portions 2a and short side portions 2b, are formed in a L shape.

A first air heat exchanger 2A through a fourth air heat exchanger 2D are used for the heat source unit 100. In addition, in a case except for cases in which it is required that the air heat exchangers are particularly distinguished, the four air heat exchangers including the first air heat exchanger 2A through the fourth air heat exchanger 2D are simply referred to as "air heat exchangers 2". When the first air heat exchanger 2A through the fourth air heat exchanger 2D are combined and viewed from an upper direction of the heat source unit 100, each of the short side portions 2b is positioned at a short hand side of the machine room 1 in such a way that the whole shape of the air heat exchangers has a rectangular frame shape, as indicated in FIG. 1B, and the air heat exchangers are disposed in such a way that a bent portion of the air heat exchangers 2, which is bent in a L shape, is positioned at a rectangular corner portion of the machine room 1. In addition, FIG. 1B schematically indicates a contact portion of the air heat exchangers 2 on the machine room 1, and wide space of an upper portion side of the air heat exchangers 2 and a state, in which the air heat exchangers 2 are laminated in a plurality of rows, is not expressed.

In the air heat exchangers 2 having a L shape, which are composed of the long side portions 2a and the short side portions 2b, although two kinds of the air heat exchangers, which are the air heat exchangers (the air heat exchanger 2B and the air heat exchanger 2C), in which a bent direction of a L-shaped portion is a L shape, and the air heat exchangers (the air heat exchanger 2A and the air heat exchanger 2E), in which a bent direction of a L-shaped portion is a reverse L shape, are required, it is needless to say that even when an upper portion and a lower portion are reversed, and when a trouble is not caused in a connection process with respect to a coolant circuit, or an attaching process and a fixing process on the machine room 1, one kind of the air heat exchangers is required. Moreover, although each kind of the air heat exchangers is desirable, the air heat exchangers 2 are produced in such a way that hairpin portions 2c are positioned at end portions of the long side portions 2a of the air heat exchangers 2, and header portions 2d are positioned at end portions of the short side portions 2b. The header portions 2d of each of the air heat exchangers are respectively positioned at central portions in a left-right direction, which are viewed from a short hand side of the machine room 1, and the hairpin portions 2c are respectively positioned at central portions in a left-right direction, which are viewed from a long hand side of the machine room 1. Thereby, there is an advantage in which maintenance of the hairpin portions 2c of the air heat exchangers 2 is easily performed in comparison with conventional air heat exchangers 2.

The first air heat exchanger 2A through the fourth air heat exchanger 2D are faced and disposed as indicated in FIG. 1A in a state where rubber sheets 21a are sandwiched on heat exchanger bases 21 (refer to FIG. 4 and FIG. 5), which are set on the machine room 1 and have upper surfaces which are inclined in an outward direction, and a distance at an upper side is expanded with respect to a distance at a lower side in such a way that the air heat exchangers are disposed in a roughly V shape when the air heat exchangers are viewed from a short hand side of the heat source unit 100 or the machine room 1. A gap between the outside surfaces of the mutual air heat exchangers 2, which are neighbored, are covered by an air heat exchanger side surface panel 22a (long hand surface) and an air heat exchanger side surface panel 22b (short hand surface). The lower portions of the air heat exchangers 2 are fixed to the heat exchanger bases 21 via air heat exchanger supporting metals (long hand surface) 23a (refer to FIG. 4) and air heat exchanger supporting metals (short hand surface) 23b, and the upper portions of the air heat exchangers 2 are directly fixed to a ceiling frame 29 (refer to FIG. 1A), or fixed to the ceiling frame 29 via a linking component, for linking the ceiling frame 29 and the air heat exchangers 2, which is not indicated.

Moreover, as indicated in FIG. 1A and FIG. 3, the fan devices 4, which are disposed at the ceiling frame 29 which composes a case of the heat source unit 100, are composed of fans 40, fan motors 41 which drive the fans 40, fan motor supporting components 42 which support the fan motors 41, fan guards 43 which are provided at upper portions of the fans 40, bell mouths 44 and the like, to which the fan guards 43 is attached, and the fan devices 4 are attached to the ceiling frame 29 of the case via a bell mouth fixing component 45. A blower room 5 is formed in the inside space which is surrounded by the heat exchanger bases 21, the first air heat exchanger 2A through the fourth heat exchanger 2D, the air heat exchanger side surface panel 22a and the air heat exchanger side surface panel 22b, and the fan devices 4.

Machine room upper girders 12 are supported and fixed by a machine room gate post 131 and a machine room middle post 132, which are attached to a machine room base frame 13, and machine room panels (long hand surface) 141 and a machine room panel (short hand surface) 142 are attached in such a way that a surface, of which outline is surrounded by the machine room base frame 13, the machine room gate post 131, and the machine room middle post 132, is covered. Moreover, a coolant circuit, which includes a compressor and the like, is disposed at a central portion in a long hand direction of the machine room 1, and a coolant circuit at a heat source side, which composes a freezing cycle, and the heat exchanging device 3 of the chiller device, which is formed in such a way that a heat exchange is performed between the heat exchanging device 3 and a circulation passage of a heat transfer fluid at a user side, are arranged at one end portion side in a long hand direction of the machine room 1, and a control board group 17, which includes a function for controlling the coolant circuit 11, is arranged at the other end portion side in a long hand direction of the machine room 1, and each of the configuration components is fixed to the machine room base frame 13.

The heat exchanger bases 21 are fixed on the machine room upper girders 12 which have a configuration in which an upper side is inclined to the inside of the heat source unit 100 when the upper side is viewed from a short hand side of the heat source unit 100, in a state where blower room drain integrated plates 15, which are inclined and disposed at the inside of the machine room 1, are sandwiched. A blower room drain gutter 16 is inclined in a long hand direction of the heat source unit 100 so as to be disposed at a lower portion of a heat source unit center side end portion, and a drain outlet 16a (refer to FIG. 7B) is provided at a downstream of the blower room drain gutter 16. In addition, when the heat source unit 100 is used at a low temperature environment, such as a cold climate area, heaters (not illustrated) are attached to lower surfaces of the blower room drain integrated plates 15 and the blower room drain gutter 16.

Figure 8:
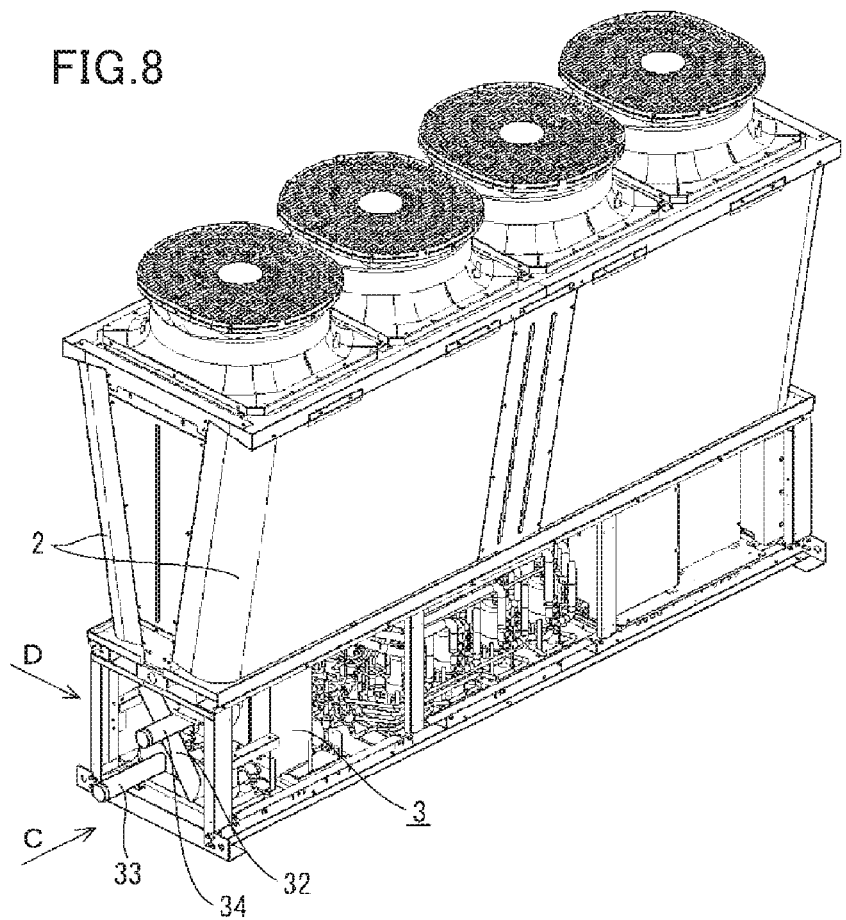
FIG. 8 is an oblique perspective view in which a heat source unit in FIG. 2 is viewed from a long hand direction opposite side.
Figure 9A:
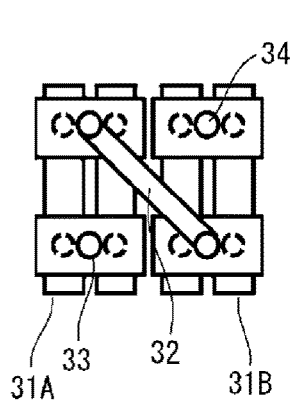
FIG. 9A, FIG. 9B and FIG. 9C are views which indicate a specific example of a heat exchanging device in FIG. 8.
Figure 9B:
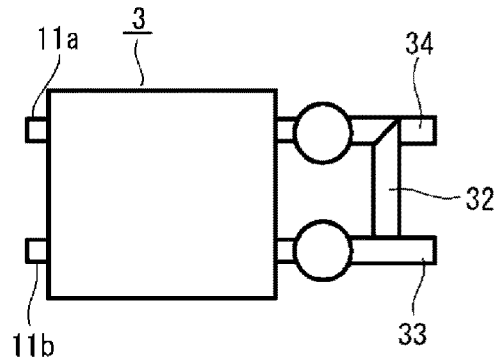
Figure 9C:
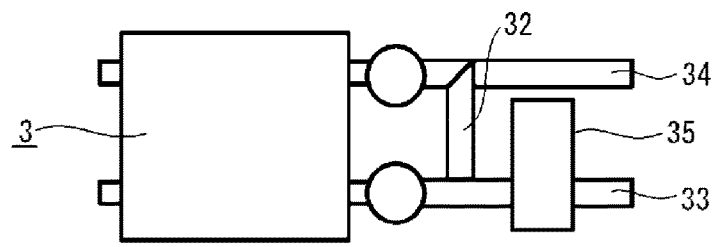
Figure 10A:
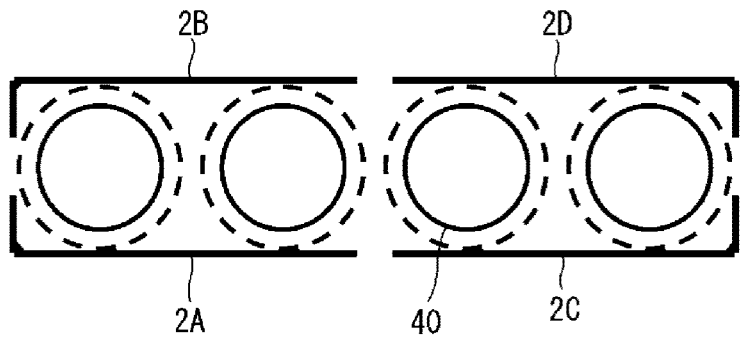
FIG. 10A and FIG. 10B are views, by which an arrangement of fans in the heat source unit in FIG. 1A
Figure 10B:
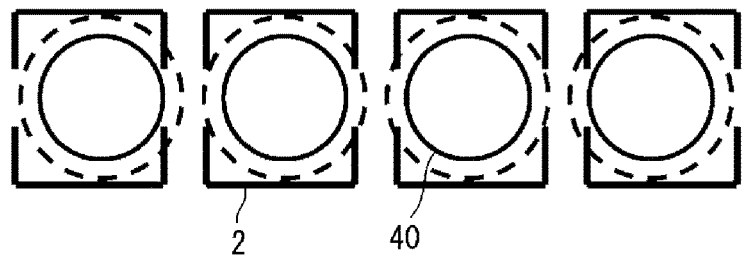

FIG. 8 is an oblique perspective view in which a heat source unit in FIG. 2 is viewed from a long hand direction opposite side, and FIG. 9A, FIG. 9B and FIG. 9C are views which indicate a specific example of a heat exchanging device 3 in FIG. 8, and FIG. 9A is a view in which the heat exchanging device 3 is viewed from a view point C in FIG. 8, and FIG. 9B is a view in which the heat exchanging device 3 is viewed from a view point D in FIG. 8, and FIG. 9C is a view which indicates an example in which a pump at a used side is disposed in a machine room. FIG. 10A and FIG. 10B are views, by which an arrangement of fans in the heat source unit in FIG. 1A is compared with a conventional example so as to be explained, and FIG. 10A indicates a case of Embodiment 1, and FIG. 10B indicates a case of the conventional example.

The coolant circuit 11, which is disposed in the inside of the machine room 1, is configured in Embodiment 1 in such a way that coolant circuits of systems, which are mutually independent with respect to each of the air heat exchangers 2, are arranged in parallel. Therefore, total four compressors and the like are provided in a state where the compressors and the like are corresponding to each of the air heat exchangers 2. Moreover, the heat exchanging device 3, which is disposed at one end portion side in a long hand direction of the heat source unit 100, is composed of a plate heat exchanger group by which heat is exchanged between a heat transfer fluid such as, for example, water or an antifreeze solution, which is supplied from a user side of a heat source which is disposed at the outside of the heat source unit 100 and is not illustrated, and a coolant of a freezing cycle which composes the coolant circuit 11. In addition, the heat exchanging device 3 in this case is designated as a water heat exchanger or the like.

In the example in FIG. 9A, FIG. 9B and FIG. 9C, the heat exchanging device 3 is configured by using a plurality of a plate heat exchanger 31A and a plate heat exchanger 31B, in which a flow passage is linked by a plate heat exchanger connecting arrangement pipe 32. In this case, the heat exchanging device 3 is disposed in such a way that two plate heat exchangers, which are disposed in parallel, are connected in series. A primary side of the heat exchanging device 3 is connected by a connecting pipe 11a and a connecting pipe 11b with respect to the coolant circuit 11 at a heat source side, and a secondary side of the heat exchanging device 3 is connected in such a way that a transfer supply pipe 34, by which a heat transfer fluid is transferred to a user side, and a return pipe 33, by which a heat transfer fluid, which is returned from the user side, is received, are extended to the outside, and the heat exchanging device 3 is configured in such a way that the heat transfer fluid is circulated between the heat source side and the user side. In addition, in this case, a coolant circuit, which includes four-system freezing cycles which are independent each other, is disposed, so that four pairs of the connecting pipe 11a and the connecting pipe 1ib in the heat exchanging device 3, which are linked to flow passages which are independently formed each other in the inside of the heat exchanging device 3 (minute view is not illustrated). Moreover, when supplying power for circulating a heat transfer fluid cannot be prepared at a facility at an installation location of the heat source unit 100, a product is provided in a state where a liquid pump 35 is linked to an attachment portion of the return pipe 33, as indicated in FIG. 9C.

Hereinafter, an operation of the heat source unit 100 according to Embodiment 1, which is configured as described above, will be explained. The coolant circuit 11 is operated, and the fan motors 41, which are attached to upper portions of the air heat exchangers 2, are operated, and the fans 40 are rotated, whereby the outside air is passed from a side surface portion at the outside of the air heat exchangers 2 through many fins, which are not minutely illustrated, of the air heat exchangers 2, and is captured to the inside of the blower room 5 of the heat source unit 100, which is formed by space which is surrounded by the air heat exchangers 2, which are faced in a V shape, which are viewed from a short hand direction. The outside air, which is captured, is more ejected from the mouths of the bell mouths 44 to an upper portion of the heat source unit 100. Heat is exchanged, by this operation, between a coolant, which is transferred from the coolant circuit 11, and the outside air around side surfaces of the air heat exchangers 2, and the outside air, of which heat is exchanged, is ejected to the upper portion of the heat source unit 100.

The heat of the coolant, of which heat is exchanged at the air heat exchangers 2, is exchanged at the heat exchanging device 3, which is included in the coolant circuit 11, between the coolant and a heat transfer fluid, such as a water or an antifreeze solution, which is supplied via the return pipe 33 (refer to FIG. 9A, FIG. 9B and FIG. 9C), and the coolant is returned again to the inside of the coolant circuit 11, and the heat transfer fluid, which is supplied from the outside, is ejected to the outside via the transfer supply pipe 34. In addition, in a case where the heat transfer fluid is supplied from the outside, when a power source for supplying the heat transfer fluid cannot be prepared at a user side, the liquid pump 35 is inserted to the return pipe 33 as indicated in FIG. 9(c), and the liquid pump 35 is operated at the heat source unit 100 side, whereby the heat transfer fluid is supplied from the outside and circulated.

In addition, a four-way valve is provided in the coolant circuit 11, and a usual route, in which a coolant, which is compressed by a compressor, is flowed to the air heat exchangers 2 and the heat exchanging device 3, is reversed, whereby the heat transfer fluid, which is supplied from the outside, can perform both cooling operation and heating operation.

It is assumed that the heat source unit 100 is disposed at both positions which are an indoor position and an outdoor position, and when the heat source unit 100 is disposed at an outdoor position, rain or snow is inputted to the inside of the blower room 5 via the bell mouths 44. Moreover, in a case where an outside air temperature around the heat source unit 100 is a low temperature which is lower than equal to 0 degree centigrade, when a heating operation for heating a heat transfer fluid, which is supplied from a user side, is continued, steam, which is included in the outside air, is condensed at surfaces of the air heat exchangers 2, and when the steam is frozen, a frost is produced. The frost prevents that the outside air is passed through the air heat exchangers 2, and the frost reduces a capability of the heat source unit 100, so that an operation of the heat source unit 100 is temporally switched to a cooling operation as a control operation for maintaining a capability. A surface temperature of the air heat exchangers 2 rises by performing the cooling operation, so that the frost, which is attached to the surfaces of the air heat exchangers 2, is melted, and the outside air is usually passed through. In this case, large-volume water, which is produced when the frost is melted, is dropped in a lower portion direction in the blower room 5.

The rain water, which is inputted in the blower room 5 as described above, or water, which is caused by a defrosting operation, directly falls to the blower room drain integrated plates 15, or moves on upper surfaces of the heat exchanger bases 21 and falls to the blower room drain integrated plates 15. The blower room drain integrated plates 15 are inclined in such a way that the blower room drain integrated plates 15 are descended to a central portion in a short hand direction of the heat source unit 100, so that the water is flowed to a central side in a short hand direction of the heat source unit 100 along the blower room drain integrated plates 15, and the water falls to the blower room drain gutter 16. The blower room drain gutter 16 is inclined in a long hand direction of the heat source unit 100, so that the water is ejected from the drain outlet 16a which is attached to a lower stream side of the blower room drain gutter 16. In addition, when the heat source unit 100 is used at a low temperature environment, such as a cold climate area, the heat source unit 100 is configured in such a way that the heaters are attached to the lower surface sides of the blower room drain integrated plates 15 and the blower room drain gutter 16, an operation control is performed by using a temperature sensor. When the heat source unit 100 is used at a low temperature environment, in which the water, which is flowed to the blower room drain integrated plates 15 and the blower room drain gutter 16, is frozen, an operation for activating a heater, which is not illustrated, is performed in order to prevent that the water is frozen.

As described above, in the heat source unit 100 according to Embodiment 1, a single unit of the air heat exchangers 2 is linked toward one system of a freezing circuit in the coolant circuit 11, whereby it is not required that a coolant is distributed, so that the number of components, which are required when the coolant circuit 11 is assembled, which is the number of the air heat exchangers 2 which compose the coolant circuit 11, the number of arrangement pipe components, or the number of case components, can be reduced in comparison with a case in which a plurality of air heat exchangers are used in one-system coolant circuit as described in a conventional example 1, and the number of assembling man-hours can be reduced, so that the heat source unit 100 can be produced with a lower cost. Moreover, the number of panels and the like, which are the air heat exchanger side surface panel (long hand surface) 22a, the air heat exchanger side surface panel (short hand surface) 22b and the like, by which an air flow is prevented at portions except for the air heat exchangers 2, can be reduced, so that the panels and the like can be also produced with a lower cost. Moreover, a pressure loss, which is caused when a coolant is distributed, can be avoided, so that a capability of the heat source unit 100 is improved.

Moreover, a bent portion of the air heat exchangers 2 having an L shape is formed at one position, so that there is an advantage in which a bending processing is more easily performed in comparison with a conventional air heat exchanger. Moreover, in order to improve a capability of the air heat exchangers 2, there are many cases in which the air heat exchangers 2 are laminated in a plurality of rows so as to be used, and the air heat exchangers 2 at each of the rows are integrally fixed at a header side. Therefore, when the air heat exchangers 2, which are laminated in a plurality of rows, are bent, in order to absorb a passage reference which is caused between the inside and the outside of a bent-R portion, a header side, which is generally fixed, is gripped, an end portion of a hair pin side is bent while the end portion is deviated. In order to produce the air heat exchangers having a U shape, which are described in a conventional example, it is required that a bending processing is performed at two times, and a first bending processing, which is similar to a bending processing for the air heat exchangers 2 of the present invention, is performed by gripping and bending a header side. However, when a second bending processing is performed, it is required that a plane plate portion, of which length is long, is lifted and bent in comparison with the first bending processing, so that more space, which is used for a torque of a bending machine and a bending processing, is required in comparison with a case in which the bending processing is terminated by the first bending processing as a case of the present invention.

Moreover, a shape and an arrangement of the air heat exchangers 2 in the heat source unit 100 and a positional relation of the fans 40 are indicated in FIG. 10A in a case of Embodiment 1, whereas a shape and an arrangement of the air heat exchangers and a positional relation of the fan in a case of the conventional example 1 are indicated in FIG. 10B. In addition, circles, which are illustrated by using solid lines, schematically indicate the fans 40, and circles, which are illustrated by using dashed lines, schematically indicate a case in which diameters of the fans 40 is increased. Firstly, in a case of the conventional example 1, ventilation portions of the air heat exchangers, which are neighboring in a long hand direction, are faced at adjacent positions, whereas faced portion don't exist in a case of Embodiment 1, so that the air heat exchangers 2 can be more effectively used. Moreover, for example, when a fan diameter is increased so as to be regulated in order to improve a capability, and when a fan diameter is increased to some extent as indicated by a dashed in the conventional example 1, the end portions of the air heat exchangers 2 are arranged just under the fans, so that it is feared that efficiency of the fans is lowered. However, for example, as indicated in FIG. 10A, the end portions of the air heat exchangers 2 are not bent toward the inside of the blower room 5 at the middle positions of the long side portions of the blower room 5 in an arrangement of the air heat exchangers 2 of the present invention, whereby a fan diameter increasing design can be performed, within an area in which the air heat exchangers 2 are not positioned just under the fans 40, with an advantage in comparison with the conventional example 1, so that a capability design can be performed without fearing that efficiency of the fans is lowered.

Moreover, a wider area of the air heat exchangers per a bottom area of the heat source unit can be secured with respect to a heat source unit which is configured as a conventional example 2, so that it is expected that a capability is improved. Moreover, when a plurality of heat source units are linked and disposed in a short direction of the heat source units in order to obtain a large-capacity heat source, in a wind tunnel in which air is flowed to the air heat exchangers which are formed by using the neighboring heat source units, a pressure loss, which is caused when the air heat exchangers absorb the outside air, is increased while the air is closed to a middle position in a long hand direction of the heat source unit. However, the air heat exchangers, which correspond to an independent coolant circuit, are symmetrically disposed in a long hand direction of the heat source unit, so that the pressure losses, which are loaded to the air heat exchangers, are identically distributed at all air heat exchangers, and constant and efficient output control can be performed.

Moreover, the header portions 2d of the air heat exchangers 2, at which the air heat exchangers 2 having a U shape are faced, are disposed in a row as described in FIG. 10B in the conventional example, so that there is a header which is arranged at a deep portion except for a short hand side of the heat source unit, whereas the header portions 2d can be arranged, only at a short hand side at which the header portions 2d are easily accessed, as indicated in FIG. 1B and FIG. 10A, in the heat source unit 100 of the present invention. Therefore, when the air heat exchangers 2 are linked and disposed, a maintenance capability of the header portions 2d of the air heat exchangers 2 is improved in comparison with a maintenance capability of the conventional header portions. Moreover, a shape of the machine room 1, which is viewed from a short hand side, is formed as a trapezoid shape of which bottom side is long, in the conventional example 1, whereas a shape of the machine room 1 is formed as a rectangle shape in the present invention, whereby wider space, by which work is performed at the outside of the machine room 1, can be obtained, so that maintenance of the machine room 1 is easily performed.

Moreover, when the heat source unit 100 is compared with the heat source unit in which the air heat exchangers having a plane shape, in which a bent portion is not included as the conventional example 2, are disposed at any one of a long hand side and a short hand side of the machine room having a rectangle shape, the short side portions 2b of the air heat exchangers 2 are also arranged at a short hand side of the machine room 1 having a rectangle shape in the present invention, whereby a wider area of the air heat exchangers 2 can be obtained with respect to an identical arrangement are of the heat source unit 100, so that a heat source unit, which has a better capability, can be obtained.

Moreover, the heat source unit 100 can be effectively used while a total area of the air heat exchangers 2 is secured, and a regulation of a fan diameter can be easily performed within an area in which a fan capability can be more effectively used, and a wider area, in which fan efficiency is not reduced, can be secured with respect to a regulation in a case where a fan diameter is increased in order to improve a capability.

Moreover, space at an upper portion of a header side of the air heat exchangers 2 in the heat source unit 100 of the present invention is secured with respect to a heat source unit in which air heat exchangers, such as air conditioners which are disclosed in Japanese Utility Model Publication No. H01-16990, which are bent in a L shape, are arranged in a U shape in a state where the air heat exchangers are elected in a vertical direction, and in comparison with the air heat exchangers which are arranged on a rectangular shape in a state where apertures having a U shape are faced each other, so that when the headers of the air heat exchangers 2 are arranged at an upper portion, maintenance space of the header can be secured while a total area of the air heat exchangers 2 is secured.

Embodiment 2

Figure 11:
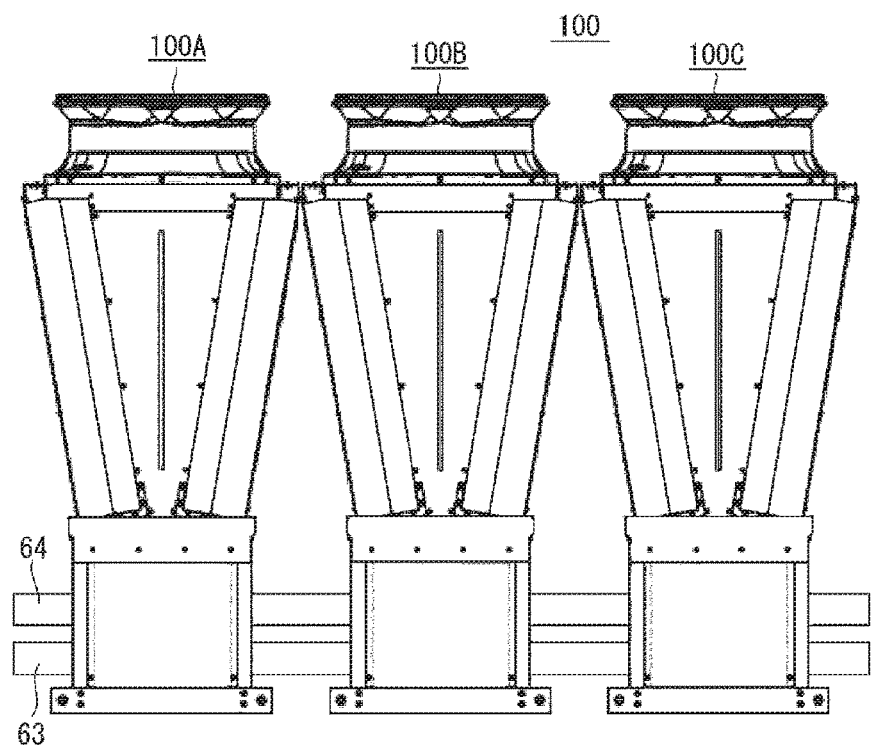
FIG. 11 is a view in which a heat source unit according to Embodiment 2 of the present invention is viewed from a direction of a short hand side of the heat source unit.
Figure 12A:
FIG. 12A and FIG. 12B are views which schematically indicate a connection state of the heat source unit in FIG. 11.
Figure 12B:
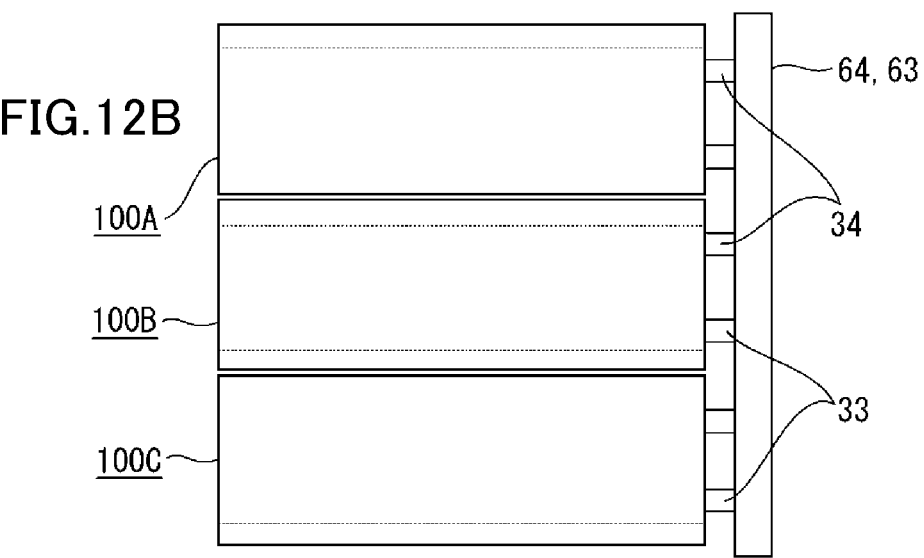
Figure 13A:
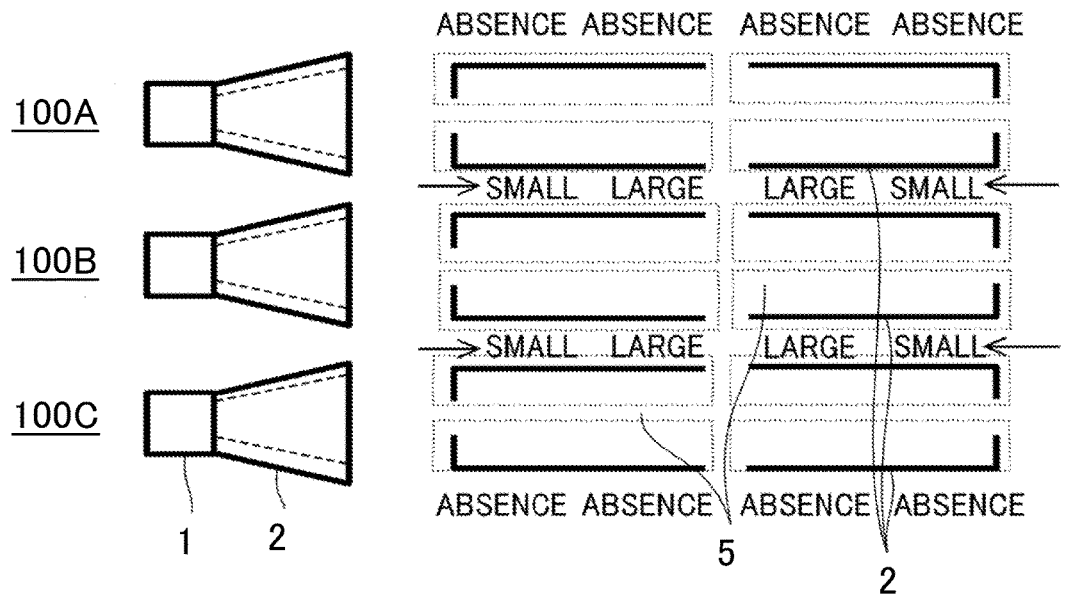
FIG. 13A and FIG. 13B are views, by which an inhaling pressure loss distribution at an air heat exchanger of a central portion of the heat source unit indicated in FIG. 11 is compared with a conventional example so as to be explained, and FIG. 13A indicates a case of Embodiment 2, and FIG. 13B indicates a case of the conventional example.
Figure 13B:
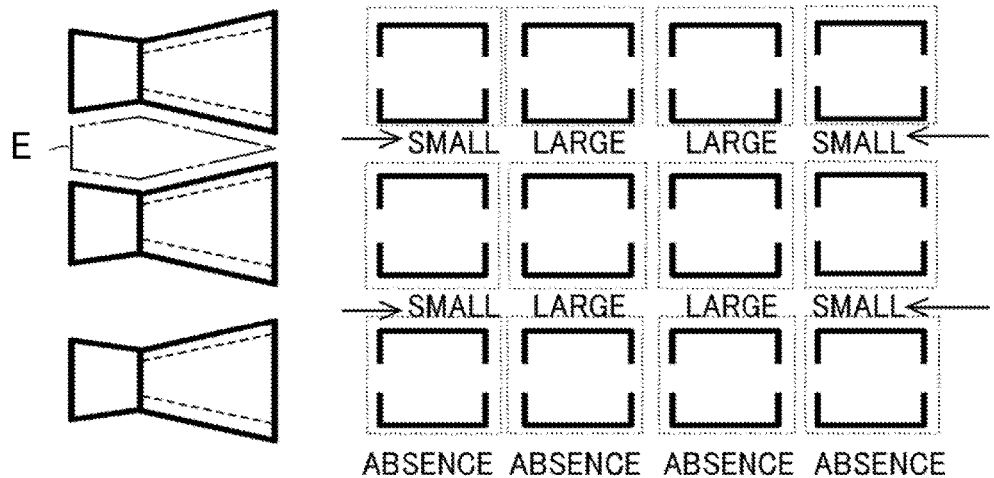

FIG. 11 is a view in which a heat source unit according to Embodiment 2 of the present invention is viewed from a direction of a short hand side of the heat source unit, and FIG. 12A and FIG. 12B are views which schematically indicate a connection state of the heat source unit in FIG. 11, and FIG. 12A is a view in which the heat source unit is viewed from a long hand side of the heat source unit, and FIG. 12B is a top view of the heat source unit. FIG. 13A and FIG. 13B are views, by which an inhaling aspiration pressure loss distribution at an air heat exchanger of a central portion of the heat source unit indicated in FIG. 11 is compared with a conventional example so as to be explained, and FIG. 13A indicates a case of Embodiment 2, and FIG. 13(b) indicates a case of the conventional example. In addition, in FIG. 13A and FIG. 13B, each of upper step sides in FIG. 13A and FIG. 13B indicates a schematic view in which air heat exchangers of the heat source unit are viewed from an upper side, and each of lower step sides in FIG. 13A and FIG. 13B indicates a schematic view in which the linked heat source unit is viewed from a short hand side.

In FIG. 11, FIG. 12A, FIG. 12B, FIG. 13A and FIG. 13B, a heat source unit 100 is configured in such a way that a plurality of heat source unit 100A through heat source unit 100C (three units in this case), which are similar to the heat source unit according to Embodiment 1, are linked in a short hand direction so as to be disposed in parallel, and each of the heat source unit 100A through the heat source unit 100C is connected to a main return pipe 63 and a main transfer supply pipe 64. All return pipes 33 of each of the heat source unit 100A through the heat source unit 100C are linked to the main return pipe 63, of which flow passage diameter is larger than a flow passage diameter of the heat source unit 100A through the heat source unit 100C, and all transfer supply pipes 34 are linked to the main transfer supply pipe 64, of which flow passage diameter is larger than the flow passage diameter of the heat source unit 100A through the heat source unit 100C. Moreover, the main return pipe 63 and the main transfer supply pipe 64 are linked to a facility (not illustrated) at a user side, which uses voluminous heat.

In a case in which heat is supplied to the facility at the user side by using the heat source unit 100 which is arranged as described above, the heat source units, which are linked, are operated and controlled while the heat source units are regulated in such a way that a required amount of heat can be totally supplied. Moreover, for example, when a required amount of heat is temporally and greatly reduced, only the heat source units corresponding to the required unit number are operated in accordance with an amount of a supply of the required amount of the heat, whereby the amount of the heat can be regulated.

Hereinafter, an operation of the heat source units according to Embodiment 2 will be explained in an example in a case where all heat source units, which are installed in a usual operation mode, are operated.

In the three heat source unit 100A through heat source unit 100C, which are linked, and in the heat source unit 100B except for the heat source units positioned at both end portions, air, which is inhaled by the air heat exchangers 2 in order to exchange the heat, is flowed from a gap of the neighboring heat source units, which is formed at a short hand side of the heat source unit, to a long hand direction of the heat source unit as indicated by an arrow in FIG. 13A, and the air is inhaled to the inside of a blower room 5 of the heat source unit, which is formed, in a frame shape with a rectangular shape, at each of long side portions 2a of air heat exchangers 2.

In a configuration as described above, when a linkage arrangement form of the conventional example 1, which is indicated in FIG. 13B, is compared with inhaling space for air, which is configured by using the neighboring heat source units according to present invention, an angle, which is formed by using a bottom side of a pentagon E, by which a inhaling space surface for air is formed, and neighboring sides, is formed as an obtuse angle in the conventional example 1, whereas the inhaling space for air can be vertically formed, so that the wider inhaling space for the air in the present invention can be secured in comparison with the inhaling space for air in conventional example 1, so that a pressure loss, which is caused by inhaling the air, is reduced, and an operation with higher efficiency can be performed.

Moreover, although an inhaling pressure loss to the air heat exchangers of the heat source unit except for both end portions in a linkage direction of a heat source unit group, in other words, an inhaling pressure loss to the air heat exchangers 2 of the heat source unit 100B at a central portion, in the three linked heat source units in this case, indicates a relative difference by using a character, such as "large" or "small", in FIG. 13A and FIG. 13B, a distribution of the inhaling pressure loss is indicated as "small" at a portion which is near to an inhaling portion, and a distribution of the inhaling pressure loss is indicated as "large" at a portion which is distant to the inhaling portion, in a case according to Embodiment 2 of the present invention and in a case of the conventional example 1. In addition, the air heat exchanger, which is indicated by a thick solid line having a L shape, indicates one air heat exchanger which is formed in a L shape and is used in the present invention, and the air heat exchanger, which is indicated by a thick solid line having a U shape, indicates one air heat exchanger which is formed in a U shape and is indicated in the conventional example 1. Moreover, a thin dashed line, which surrounds the air heat exchangers, indicates as a virtual line that a coolant circuit of one system is formed by using the air heat exchanger which is positioned in an inside area which is surround by an identical solid line. Moreover, in the air heat exchangers of the heat source unit at the both end potions in the linkage direction of the heat source unit group, in the heat source unit 100A and the heat source unit 100C at the both end portions in the three linked heat source units in this case, an inhaling pressure loss to the air heat exchangers 2, which are corresponding to the both end potions in the linkage direction, is more reduced in comparison with the other air heat exchangers 2, so that the inhaling pressure loss is described as "absence" in order to indicate a relative difference.

It is obvious in reference to FIG. 13A and FIG. 13B that, in the heat source unit according to Embodiment 2, which is indicated in FIG. 13A, all inhaling pressure losses of the air heat exchangers of a four-system coolant circuit which composes the heat source unit 100B which is positioned at a central position, are identical each other, whereas in the heat source unit of the conventional example 1, which is indicated in FIG. 13B, in a four-system coolant circuit which composes the heat source unit which is positioned at a central position, an inhaling pressure loss of the air heat exchangers of the two-system heat source unit, which are positioned at an inhaling side of the outside air and at upper-lower both end positions in FIG. 13B, is indicated as "small", whereas an inhaling pressure loss of the air heat exchangers of the two-system heat source unit, which are positioned at a central portion in an upper-lower direction in FIG. 13B, is indicated as "large", so that a variation of the inhaling pressure losses is caused in a coolant system.

In the heat source unit 100 according to Embodiment 2 of the present invention, control of the number of revolutions or the like of each of the coolant circuits is justified, whereby an equal output, which is independent to each of the coolant circuits, can be realized. Therefore, in consideration of a parameter when an operation control is performed, only consideration corresponding to one system of a coolant circuit 11 is performed, whereby the output can be controlled. Moreover, when a design, by which operation efficiency of the whole heat source unit 100, in which operation efficiency of an element instrument, such as a compressor, is included, is optimized, is performed, pressure loss distribution situations of the air heat exchangers, which are corresponded to each of the coolant circuit system, are different in the conventional example 1, so that it is required that situations of a plurality of coolant circuit systems are considered with multiple considerations. However, in the present invention, an equivalent condition of a pressure loss, which is operated to the air heat exchangers in a plurality of coolant circuit systems, is realized, so that the design of the operation efficiency is limited within an area of one system of the coolant circuit 11, and the capability design can be simply performed. Moreover, in the conventional example 1, it is required that the control design is performed in such a way that a sum of outputs of a plurality of coolant circuit systems is increased, whereas, in the present invention, the control design is limited to only one system of the coolant circuit, so that the control design, by which more effective output is obtained, can be performed. Moreover, the inhaling pressure loss to the air heat exchangers is reduced in comparison with the conventional inhaling pressure loss, and more effective operation of the heat source unit 100 can be performed.

Embodiment 3

Figure 15A:
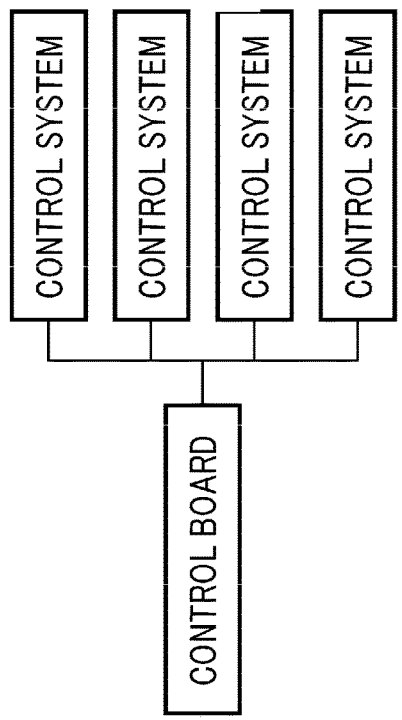
FIG. 15A, FIG. 15B and FIG. 15C are views which indicate configurations of control boards with respect to control systems, and FIG. 15A indicates a normal case, and FIG. 15B indicates a case in which a control board of all control systems is commonly used, and FIG. 15C indicates a case in which control boards of each of the control systems, in which air heat exchangers are disposed on an identical long hand surfaces, are commonly used.
Figure 15B:
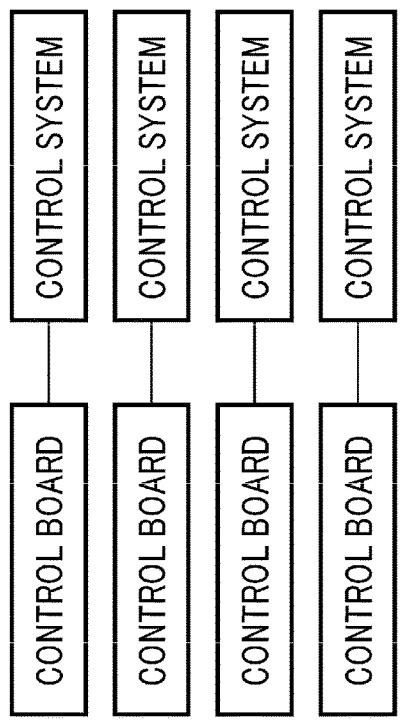

The control board group 17, which controls each of the coolant circuits 11 which are indicated in Embodiment 2, is usually configured as indicated in FIG. 15A in such a way that an individual control board, which is corresponding to each of control systems, is collected. However, when the control board group 17 has a form by which a control board, which controls each of the control systems, is commonly used, for example, as indicated in FIG. 15B, and even when a system of the coolant circuits 11 is commonly controlled as indicated in Embodiment 2, an effective output is obtained, so that a cost can be reduced while output efficiency is maintained, in comparison with a case in which a control mechanism of each of the coolant circuits 11 is individually assigned.

Figure 15C:
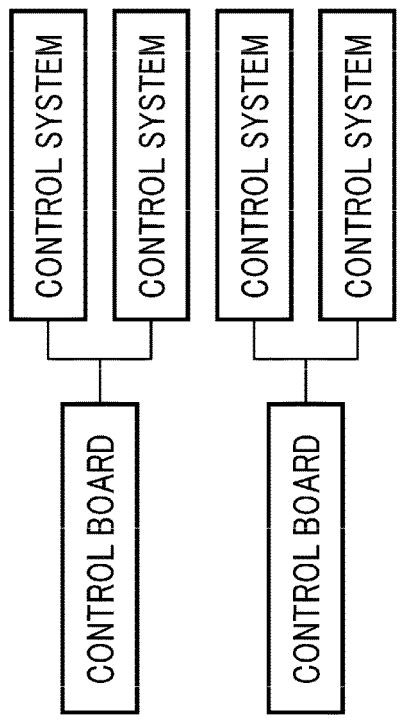

Moreover, in a case of a control method of each of the coolant circuits 11 which are indicated in Embodiment 2, inhaling pressure losses to the air heat exchangers of the heat source units at both end portions in a linkage direction of the control board group 17, in other words, inhaling pressure losses to the air heat exchangers 2 of the heat source unit 100A and the heat source unit 100C at both end portions, in the three linked heat source units in this case, are different at the outside surface and at the inside surface, so that the operation efficiency is reduced at the heat source units at both end portions in comparison with the heat source unit except for the heat source units at the both end portions. When there is many linked units, although a reduction degree of the operation efficiency of the whole heat source units can be reduced, when there is few linked units, or when a level of required operation efficiency is high, a control mechanism is commonly used for only each of coolant circuits in which the air heat exchangers 2 are arranged at an identical surface in a long hand direction of a heat source mechanism as indicated in FIG. 15C, whereby an effective operation can be performed in comparison with Embodiment 2 while a simplification of the control mechanism is realized to a some extent.

Embodiment 4

FIG. 14A and FIG. 14B are views which schematically indicate a connection state of a heat source unit according to Embodiment 4 of the present invention, and FIG. 14A is a view in which the heat source unit is viewed from a long hand side of the heat source unit, and FIG. 14B is a top view of the heat source unit. In a heat source unit 100 in FIG. 14A and FIG. 14B, three heat source unit 100A through heat source unit 100C, which are similar to the heat source unit according to Embodiment 1, are linked in a short hand direction, and a point of the heat source unit 100 is similar to a point of the heat source unit 100 according to Embodiment 2. It is different from the heat source unit 100 according to Embodiment 2 that a transfer supply pipe 64 toward a user side and a return pipe 63 from the user side are disposed in such a way that the transfer supply pipe 64 and the return pipe 63 penetrate a machine room 1 in a short direction of the machine room 1, and connecting portions 60, by which the transfer supply pipe 64 and the return pipe 63, which are neighbored, are mutually linked when the heat source unit 100A through the heat source unit 100C are linked, are provided at each of end portions in a short hand direction of the transfer supply pipe 64 and the return pipe 63. Thereby, as indicated in FIG. 14B in Embodiment 4, each of the heat source units is disposed in such a way the transfer supply pipe 64 and the return pipe 63 linearly penetrate each of the heat source units which are linked. In addition, the transfer supply pipe 34 and the return pipe 33 (refer to FIG. 9A, FIG. 9B and FIG. 9C) of each of the heat source units are connected to the transfer supply pipe 64 and the return pipe 63, which are respectively corresponding to the transfer supply pipe 34 and the return pipe 33, at the inside of the machine room 1.

In the heat source unit 100 according to Embodiment 4, which is configured as described above, each of water arrangement pipe headers, which are installed in the machine room 1 of each of the heat source unit 100A through the heat source unit 100C and are not illustrated, is linked to the transfer supply pipe 64 and the return pipe 63, which are respectively corresponding to the water arrangement pipe headers, at the inside of the machine room 1. When the heat source unit 100 is configured as described above, an arrangement pipe, for supplying and ejecting a heat transfer fluid, by which a heat source unit, which is protruded to the outside of space in which the heat source unit is continuously disposed in the conventional heat source unit 100, is added, can be installed in the space in which the heat source unit is continuously disposed, so that arrangement space can be reduced. Moreover, the arrangement pipe, which is installed in the heat source unit 100, is linked only by the connecting portions 60, whereby the required number of man-hours and the number of components can be reduced, so that attachment work can be easily performed at a site, and moreover, a cost of an arrangement pipe, which is required for the attachment work, can be reduced.

In addition, in the scope of the present invention, it is possible that a part of each of embodiments or all embodiments is freely combined, or each of embodiments is suitably modified or omitted.

For example, in the above-described embodiments, although the heat source unit 100 is explained by using a case in which four air heat exchanger 2A through air heat exchanger 2D are connected to four-system freezing circuits which are independent each other, the heat source unit 100 is not limited to the case, and the heat source unit 100 may be suitably modified, for example, in such a way that each of two air heat exchangers in the four air heat exchanger 2A through air heat exchanger 2D are connected to two-system freezing circuits which are independent each other.

Moreover, positions of the hairpin portions 2c of the air heat exchangers 2 and positions of the header portions 2d can be reversely positioned. In this case, although a maintenance capability of the header portions 2d is deteriorated, the positions of the header portions 2d are positioned at a central portion in a long hand direction of the machine room 1, whereby a distance from the header portions 2d to a compressor or the like of the coolant circuit 11, which is disposed at the central portion, so that there is an advantage in which a length of an arrangement pipe of the freezing circuit can be reduced.

DESCRIPTION OF THE SYMBOLS

"1" is a machine room; "11," a coolant circuit; "17," a control board group; "2 (2A through 2D)," air heat exchangers; "2a," long side portions; "2b," short side portions; "2c," hairpin portions; "2d," header portions; "3," a heat exchanging device; "33," a return pipe; "34," a transfer supply pipe; "40," fans; "5," a blower room; "60," connecting portions; "63," a main return pipe; "64," a main transfer supply pipe; "100 (100A, 100B, and 100C)," a heat source unit.

What is claimed is:
1. A heat source unit comprising:
a plurality of air heat exchangers including radiating fins having a plate shape, which are corresponding to a predetermined number, are spaced in a plate thickness direction of the radiating fins so as to be arranged, and a plurality of tubes, in which a coolant in a freezing cycle is flowed, are inserted toward the radiating fins in the plate thickness direction of the radiating fins so as to be linked to the radiating fins, are faced and arranged in a right-left direction, at an upper portion of a machine room having a rectangular shape in planar view, in a state where a distance at an upper portion side is expanded in such a way that the air heat exchangers are formed in a V shape viewed from a short side; wherein
the air heat exchangers are composed of a first air heat exchanger through a fourth air heat exchanger, each formed in a L shape, which include long side portions and short side portions in a state where one end portion sides in an extension direction of the tubes are bent; and each of the short side portions is disposed at a short side of the machine room having a rectangular shape in planar view, in such a way that an arrangement shape of the first air heat exchanger through the fourth air heat exchanger is formed as a frame shape having a rectangular shape in planar view;

wherein header portions are provided at end portions of the short side portions in the first air heat exchanger through the fourth air heat exchanger, and hairpin turn portions are provided at end portions of the long side portions.

2. The heat source unit as recited in claim 1, wherein the first air heat exchanger through the fourth air heat exchanger are corresponding to freezing circuits of systems, which are mutually independent, so as to be connected, and are configured in such a way that the first air heat exchanger through the fourth air heat exchanger can be operated with respect to each of the freezing circuits.

3. The heat source unit as recited in claim 1, wherein the machine room is formed in a rectangular solid shape.

4. The heat source unit as recited in claim 1, wherein a heat exchanging device of a chiller device, which is formed in such a way that heat is exchanged between a coolant circuit at a heat source side, which composes the freezing cycle, and a circular passage of a heat transfer fluid at a user side, is disposed at the inside of the machine room.

5. The heat source unit as recited in claim 4, wherein a main transfer supply pipe to the user side and a main return pipe from the user side, which compose the circular passage at the user side, are disposed in such a way that the main transfer supply pipe and the main return pipe penetrate the machine room in the short side of the machine room; and a connecting portion, which can be linked to the circular passage, is provided at each of end portions in a short hand direction of the main transfer supply pipe and the main return pipe.

6. The heat source unit, wherein a plurality of the heat source units, as recited in claim 1, are linked on their short sides.

7. The heat source unit as recited in claim 6, wherein a control mechanism of a control board of each of coolant circuits is commonly used for each of coolant circuits, in which the air heat exchangers are arranged at an identical surface in a heat source mechanism long hand direction, in each of the heat source units of a plurality of the linked heat source units.

8. The heat source unit as recited in claim 6, wherein a control mechanism of a control board of each of coolant circuits is commonly used for each of coolant circuits, in each of the heat source units of a plurality of the linked heat source units.

* * * * *